United States Patent [19]

Artama et al.

[11] 3,792,993
[45] Feb. 19, 1974

[54] APPARATUS FOR HARDENING GLASS PLATES

[76] Inventors: Arvi Artama; Erkki Artama, both of Laukontori 4C, Tampere, Finland

[22] Filed: Sept. 20, 1971

[21] Appl. No.: 181,939

[30] Foreign Application Priority Data
Sept. 21, 1970  Finland.............................. 2564/70

[52] U.S. Cl........................ 65/163, 65/350, 65/351
[51] Int. Cl. ...................... C03b 25/04, C03b 27/00
[58] Field of Search .............. 65/163, 349, 350, 351

[56] References Cited
UNITED STATES PATENTS

| | | | |
|---|---|---|---|
| 3,338,695 | 8/1967 | Ritter, Jr............................ | 65/163 X |
| 3,488,173 | 1/1970 | Mc Master......................... | 65/163 X |
| 3,594,149 | 7/1971 | Pickavance et al................ | 65/163 X |
| 1,626,395 | 4/1927 | Crowley............................ | 65/356 X |

Primary Examiner—Arthur D. Kellogg
Attorney, Agent, or Firm—Tab T. Thein

[57] ABSTRACT

Apparatus for hardening glass plates, comprising a tunnel-like heating furnace, preferably including several aligned units, through which glass plates to be hardened are fed, rotary conveying elements, e.g., in the form of rollers, for feeding the glass plates into, through and out of the furnace, a quenching device being connected with the rear part of the furnace, for rapidly quenching the heated glass plates in order to harden them, and means for imparting a periodical rapid traverse movement to at least some of the rollers, the traverse movement making possible rapid conveying of the glass plates from the furnace to the quenching device, so as to insure uniformity of quenching and hardening as well as to avoid possible distortions.

6 Claims, 6 Drawing Figures

APPARATUS FOR HARDENING GLASS PLATES

The invention relates to an apparatus for hardening glass plates, and particularly window and windshield plates for automobiles or the like. The apparatus comprises a tunnel-like heating furnace through which the glass plates to be hardened are conveyed, and at the end of the furnace a quenching apparatus which by means of compressed air jets quenches the surfaces of the heated glass plates very rapidly, causing thus tension between the surfaces and the inner parts of the glass plates. This treatment increases the strength of the glass and therefore constitutes a hardening thereof.

Apparatus of this kind are already known as such but they still have many defects unsolved until now. For example, the introduction of the glass plates into the apparatus is very critical and also troublesome because of the very high conveying speed needed for the glass plates during their way through the furnace. The required high speed also causes that the tunnel furnace becomes very long, thus resulting in a very expensive construction. A long furnace also needs a great and expensive floor area in the manufacturing plant, thus increasing production costs. On the other hand the great speed is necessary to make the quenching of the glass plates sufficiently rapid in order to make the hardening uniform. There also occur troubles in known apparatus because of breakings and distortions of the glass plates, causing interruptions in the function of the apparatus.

These and other defects can be avoided by means of the glass plate hardening apparatus according to the present invention.

Other objects and many of the attendant advantages of the invention will be readily appreciated as the same becomes better understood by reference to the following detailed description, when considered with the accompanying drawings, wherein FIG. 1 is a somewhat schematic top view of the fore part of an exemplary embodiment of the inventive apparatus for hardening glass plates, including a feeding table thereof;

First, the general features of the invention will be broadly described. The hardening apparatus comprises an elongated tunnel furnace having a feeding table or a similar structure on its fore part, on which table the glass plates to be hardened are placed, close to each other, and then fed into the tunnel furnace for heating. After the glass plates have passed this furnace on a roller conveyor and have been heated to the temperature of about 600°C, depending on the quality of the glass being treated, they reach the quenching part or device where they are quenched by means of strong jets of compressed air streaming through several nozzles above and below the roller conveyor, causing a rapid cooling of the glass-plate surfaces and thus the strengthening and hardening thereof, because of the tension being brought about between the surfaces and the inner parts of the glass plates.

Figure 1:
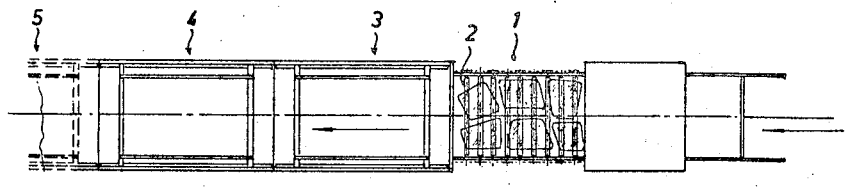
Figure 2:
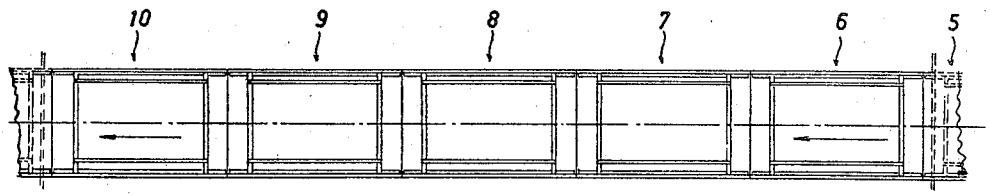
FIG. 2 is a similar top view of the apparatus of FIG. 1 (as continued to the left-hand side of it)
Figure 3:
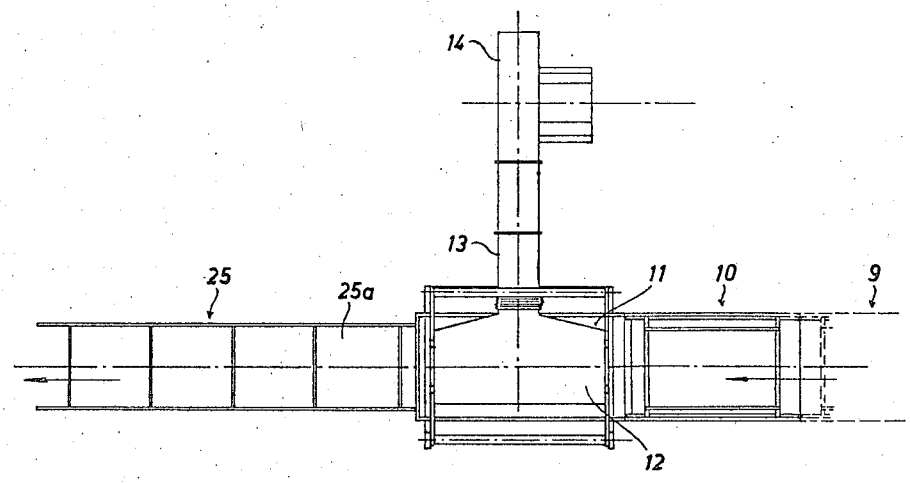
FIG. 3 is a top view of the rear part of the apparatus, with a quenching device (as a further leftward continuation of FIGS. 1 and 2, some parts being shown again)

The apparatus according to the invention (as shown in FIGS. 1 to 3) is continuous but because it could not be shown on a single drawing sheet clearly enough, the apparatus is drawn as partial, broken-apart figures, on three separate sheets. Thus FIG. 2 shows the middle part of the apparatus and FIG. 3 shows the end part thereof, consecutively from the righthand side toward the left. Arrows show the direction of movement of the glass plates through the inventive apparatus.

In full detail, the glass plate hardening apparatus according to the invention comprises a feeding table 1 provided with horizontally mounted rotary conveyor rollers 2, on the same level and transversally in regard to the longitudinal direction of the apparatus. The glass plates (schematically shown in FIG. 1) being fed fed into the apparatus are led close to and one after the other on this table, and on the conveyor rollers, while they stand still; rollers 2 are mechanically and periodically driven so that they stand still for predetermined times during which the charging of the glass plates onto feeding table 1 is performed.

The control of the periodical drive is performed by means of a control device which also controls the functions of other parts of the hardening apparatus. The drive of the rollers is preferably made by means of a chain drive in which the end of each roller is provided with a sprocket wheel engaging the driving chain. The chain drive of the feeding table is similar to the furnace units described in the subsequent text, these furnace units being the main building parts of the whole tunnel furnace.

In the construction shown in FIGS. 1 to 6 table 1 feeds the glass plates into the tunnel furnace consisting of successively interconnected furnace units, 3, 4, 5, 6, 7, 8, 9 and 10, through which the glass plates are conveyed on rotary rollers with a predetermined velocity. The furnace units are similar in other respects but the conveyor rollers of furnace unit 10 (not shown in FIG. 1 at 2 for table 1, and in FIGS. 4 and 6 at 18) are provided with two different rates of rotating speeds according to the invention, namely first the same speed as all other furnace parts mentioned before, but in addition to this a rapid traverse movement by means of which the heated glass plates are conveyed very rapidly from the end of the furnace under the nozzles of the quenching air blower.

This periodical rapid traverse according to the invention makes the quenching and hardening of the glass plates very uniform because the quenching actually begins just after the rapid traverse is ended, and the glass plates are then completely under the action of the air jet nozzles of the quenching device, During the quenching action the conveying rollers run slowly again.

The end part of the apparatus as shown in FIG. 3 is also provided with a roller conveyor or quenching table 11 on which the glass plates to be hardened are fed from the last furnace unit 10 by means of the rapid traverse movement mentioned before. Above table 11 are mounted a plurality of air jet nozzles blowing air right down with a high velocity unto the surface of the heated glass plates, thus causing the quenching and hardening of the glass plates.

This air blowing device is schematically indicated in the drawing at 12. A nozzle head of the air blower makes an oscillating motion in the horizontal plane which motion improves the uniformity of the quenching action. Air is conducted to a pipe 13 from a blower 14 into the nozzle head (FIG. 3). From quenching table 11 the glass plates are conveyed further to a cooling table 25, by way of an intermediate unit 25a, where they are cooled further and finally taken away from the end of table 11 and conveyed to the subsequent manufacturing stages (not shown).

Figure 4:
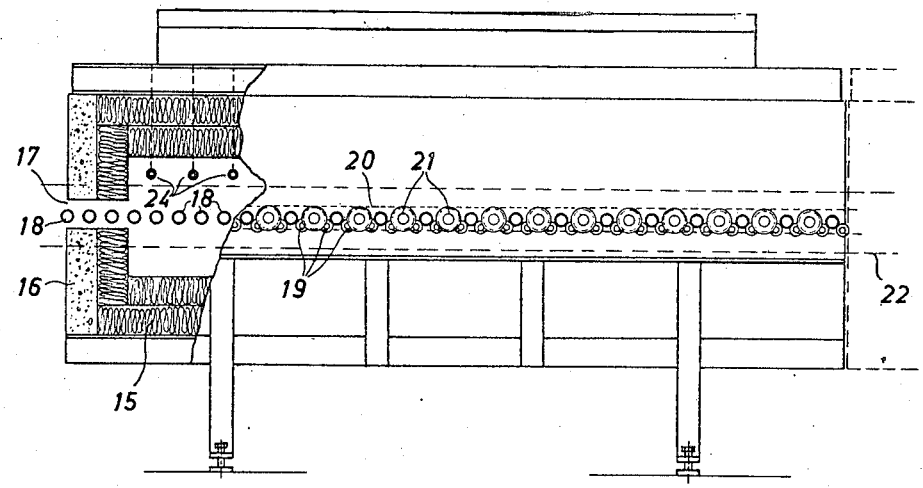
FIG. 4 shows a partial side view of the apparatus according to the preceding figures.
Figure 5:
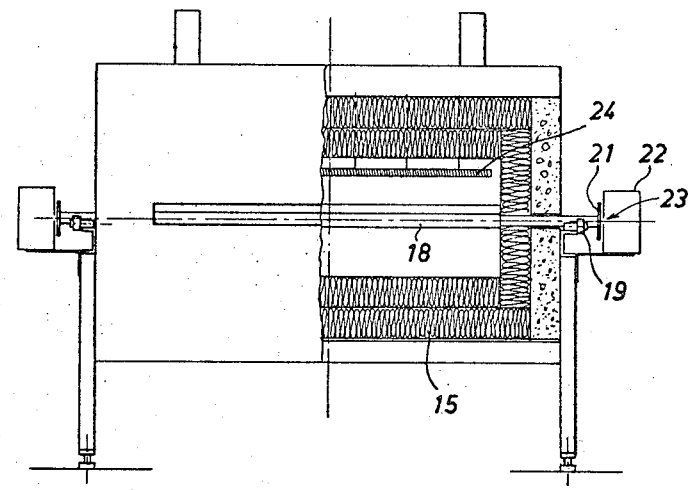
FIG. 5 is a transversal sectional view of the unit shown in FIG. 4.

The exemplary furnace unit shown in FIGS. 4 and 5 comprises a welded body constructed of suitably dimensioned steel profiles and is covered with sheet metal. Its inside walls, bottom and top are preferably completely lined with a fire-proof, heat-insulating material 15. The whole tunnel furnace is assembled from such units by successively connecting several of them together. The furnace units have at their end surfaces an insulating wall 16 leaving only a quite narrow opening 17 through which the glass plates to be heated are conveyed into the subsequent furnace unit on hollow, rotary rollers 18. These rollers are easily rotatable on roller bearings 19 and are driven by a chain 20 engaging sprocket wheels 21 at the ends of rollers 18.

Because rollers 18 are assembled quite close to each other, sprocket wheels 21 are mounted only on the one end of each roller, and consequently on every second roller on the one end and on every other second roller on the other end (not fully shown in FIG. 5). There are also mounted corresponding driving chains 20 on both sides of the furnace. Because rollers 18 are easily exposed to overheating in the furnace, there is provided an air cooling equipment consisting of an air conducting tube or channel 22 on both sides of the furnace, this channel having close to the end of each roller a nozzle or opening 23 which blows cooling air into the hollow or tube-shaped rollers 18.

The furnace units are preferably provided with electrical heating because this kind of heating is very easily adjustable. The heating is arranged, for example, by means of electric resistance units 24 mounted below the top of each furnace unit (FIGS. 4, 5). Thus the heat developed can be adjusted by controlling the power of the electric current fed into these resistance units.

While the glass plates are conveyed through the successive furnace units, they will be heated mainly on the first two-thirds of the whole length of the furnace, and on the remaining one-third the heat is equalized so that the glass plates go through the same specified heat, properly suitable for hardening, this heat depending on the quality of the glass. With a view to improving the equalization of the heat, the electrical heating units are mounted longitudinally in the rear ends of the furnace units while they are mounted transversally in the fore ends of the furnace assembly units.

Figure 6:
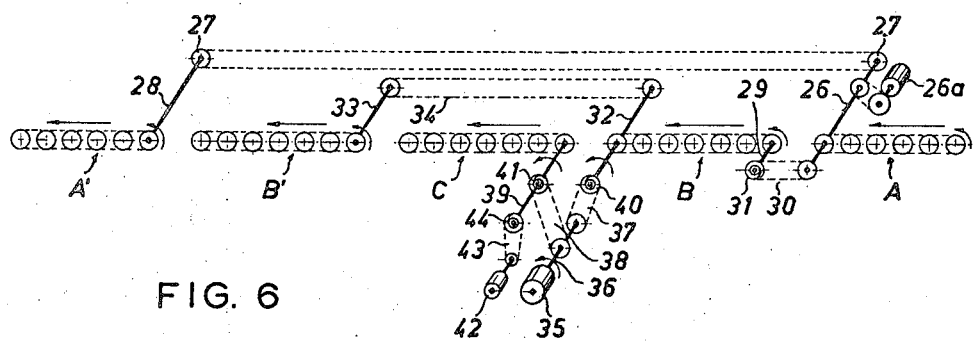
FIG. 6 illustrates schematically, in a perspective view, a power transmission mechanism for the various parts of the inventive apparatus.

FIG. 6 shows schematically the driving mechanism of the conveying rollers (such as 2 or 18) in the various parts of the furnace with a view to producing the desired velocity for the various stages or units.

In FIG. 6 the letter A indicates a conveying mechanism in the fore part of the apparatus, in which mechanism the conveying rollers are coupled together with a driving chain beginning from feeding table 1 to furnace parts 3 to 9, including the latter (FIGS. 1, 2). These parts have always the same conveying velocity.

Similarly the rear part of cooling table 25, 25a (FIG. 3) has the same velocity. In FIG. 6 a roller group A' means just the rollers of part 25, 25a. As shown in FIG. 6 roller group A is driven by a conventional motor 26a coupled to a shaft 26, a connecting chain, sprocket wheels 27 and another shaft 28 (at the remote end of the chain) with conveying roller group A', thus giving the same speed for both roller groups A, A'.

The speed of the conveying rollers in the rear part 10 of the apparatus can be increased to a rapid traverse movement, according to the invention, by means of a particular accelerating mechanism, with which the glass plates are rapidly conveyed below the nozzles of quenching blower 12. Consequently the already quenched and hardened glass plates are rapidly conveyed away to cooling table 25. FIG. 6 also shows a part B of the driving mechanism for the rollers in furnace unit 10. Roller group B rotates during normal conveying motion with the same speed as A and A', driven by the afore-mentioned shaft 26 and a shaft 29 as well as a connecting chain drive 30. On shaft 29 is mounted a freewheeling coupling 31, permitting a higher running speed for this roller group during the acceleration stage.

FIG. 6 further shows a roller group B' with a driving mechanism for the fore part of cooling table 25, which is coupled by means of shafts 32, 33 and of a driving chain 34 with roller group B. Thus both roller groups B, B' have always the same running speed.

Conveyor or quenching table 11 whose roller driving mechanism is indicated with C in FIG. 6 has the same velocity (about 3 centimeters per second for a 17-second time period) during the quenching stage as the other roller groups, but during the rapid traverse movement its velocity is the same as that of roller groups B, B'. Thus the glass plates, already quenched and hardened, are moving away from table 11 to table 25, and at the same time new heated glass plates arrive from rear furnace part 10 unto quenching table 11, under the air jet nozzles. The normal conveying movement is produced by means of a suitable electric motor, such as 26a, coupled e.g. to shaft 26.

The rapid traverse movement is produced according to the invention by means of a particular accelerating mechanism. This mechanism is shown in FIG. 6 only schematically as it can be constructed in various ways. The mechanism should be made so that it imparts the various rollers gradually increasing velocity in the beginning of the acceleration, and correspondingly a gradually decreasing velocity at the end of the motion. This is very important because the glass, being somewhat soft and plastic in the heated condition, is subject to distortion by the action of inertial forces which could be produced when velocity would suddenly increase or decrease.

According to a preferred exemplary embodiment of the invention the accelerating mechanism is made according to the principles of cam or eccentric mechanisms which are capable of giving gradually increasing and then decreasing velocities for the roller motion. the device can be constructed e.g., so that its driving motor rotates a cam of a suitable size about half a revolution, and then the cam in its turn pushes a rack or a toothed rack by means of a connecting rod, which rack then rotates a gear, correspondingly at first increasing and then decreasing speeds. This gear can be connected with a sprocket wheel driving the chain which is in connection with the conveying rollers, as described before. The gear must naturally be provided with a free-coupling device permitting free rotation under normal conveying speed.

In FIG. 6 an accelerating mechanism 35 drives a shaft 36. The latter in its turn drives shaft 32 of roller group B, and a shaft 39 of the other roller group C, by means of chain drives 37, 38. Corresponding sprocket wheels 40, 41 on these shafts are provided with free-running couplings, permitting free rotation of these shafts at normal conveying speed.

Further a particular feature of the invention should be mentioned. Sometimes it may be possible that accidentally some glass plate will be broken or distorted, thus disturbing continuous production. According to the invention these broken glass plates can be rapidly conveyed away and removed by means of a particular rapid traverse motor 42 connected to shaft 39 in roller group C by means of a chain drive 43. A sprocket wheel 44 of this drive 43 on shaft 39 is also provided with a free coupling which will be connected by starting motor 42. A starting push-button for this motor is within easy reach of the machine operator.

It is obvious that the construction of the apparatus can be varied within the limits of the invention. It is possible to combine a particular cleaning machine before feeding table 1, by means of which the glass plates are cleaned before their feeding into the furnace, in order to prevent possible extraneous substances from burning into the surfaces of the glass plates.

Concerning the controlling device mentioned before, by means of which periodical driving is performed, this device can be either mechanical or electrical. The normal as well as the rapid traverse velocities are preferably made infinitely or continuously variable by means of some electrical driving motor, known as such.

It should be understood of course that the foregoing disclosure relates only to preferred embodiments of the invention and that it is intended to cover all changes and modifications of the examples described which do not constitute departures from the spirit and scope of the invention.

We claim:

1. An apparatus for hardening glass plates, comprising, in combination, a tunnel-like heating furnace through which glass plates to be hardened are conveyed by means of rotary conveying roller means for feeding the glass plates into, through and out of said furnace, a quenching device connected with the rear part of said furnace, for rapidly quenching the heated glass plates in order to harden them, means for imparting a periodical rapid traverse movement to at least some of said roller means, the traverse movement making possible rapid conveying of the glass plates from said furnace to said quenching device so as to insure the uniformity of quenching and hardening as well as to avoid distortions, a feeding table at the input of said furnace, a cooling table, a discharging table, the two latter at the output of said furnace, means for driving said roller means in several groups, wherein at least some of said roller means are hollow, cooling means for introducing a coolant into said roller means, and wherein said furnace has in its end walls narrow openings through which the glass plates can pass without substantial heat losses, a mechanism for providing additional rapid reciprocating movement for at least one of said roller groups, and means for uncoupling said mechanism during the feeding movement as well as during the rapid traverse movement, the additional rapid reciprocating movement being provided for selective use in order to rapidly remove accidentally broken glass plates from the apparatus.

2. The apparatus as defined in claim 1, further comprising transmission means interconnecting said roller groups to operate with substantially the same speed without the rapid traverse movement, while selected ones of said roller groups are imparted the traverse movement in addition to the feeding movement.

3. The apparatus as defined in claim 1, further comprising a drive mechanism for producing a gradually increasing velocity at the beginning of the rapid traverse movement of some of said roller groups, and a gradually decreasing velocity at the end of the traverse movement, in order to prevent the heated glass plates from being distorted by the action of inertial forces.

4. The apparatus as defined in claim 1, wherein said mechanism includes chain drive means adapted to cooperate with said uncoupling means upon actuation of a motor energized by the operator of the apparatus for removing the accidentally broken glass plates.

5. The apparatus as defined in claim 1, further comprising coupling means associated with selected ones of said roller groups, permitting free rotation of the other roller groups during the rapid traverse movement imparted to said slected roller groups.

6. The apparatus as defined in claim 5, wherein said roller groups include a first group having rollers at said feeding table and in the main part of said furnace, a second group having rollers in said rear part of the furnace, a third group having rollers at said quenching device, a fourth group having rollers on the fore part of said cooling table, and a fifth group having rollers at said discharging table.

* * * * *